United States Patent
Morath et al.

(10) Patent No.: US 8,649,943 B2
(45) Date of Patent: Feb. 11, 2014

(54) CONTROL SYSTEM FOR CONSTRUCTION MACHINES AND METHOD FOR OPERATING THE CONTROL SYSTEM

(75) Inventors: Erwin Morath, Lauterach (DE); Eduard Zink, Mehrstetten (DE); Joachim Treuer, Ehingen (DE)

(73) Assignee: Liebherr Werk Ehingen GmbH, Ehingen/Donau (DE)

(*) Notice: Subject to any disclaimer, the term of this patent is extended or adjusted under 35 U.S.C. 154(b) by 420 days.

(21) Appl. No.: 12/977,210

(22) Filed: Dec. 23, 2010

(65) Prior Publication Data

US 2011/0153038 A1     Jun. 23, 2011

(30) Foreign Application Priority Data

Dec. 23, 2009   (DE) .......................... 10 2009 060 321

(51) Int. Cl.
*G06F 7/00* (2006.01)
(52) U.S. Cl.
USPC ............. 701/50; 701/36; 701/30.3; 701/31.1; 701/34.2
(58) Field of Classification Search
USPC ........... 701/29.1, 29.7, 30.3, 30.5, 30.9, 31.1, 701/33.7, 34.2, 36, 50
See application file for complete search history.

(56) References Cited

U.S. PATENT DOCUMENTS

| | | | |
|---|---|---|---|
| 6,434,476 B1 | 8/2002 | Zagone | |
| 2003/0133526 A1 | 7/2003 | Millsap et al. | |
| 2006/0287783 A1 | 12/2006 | Walker | |
| 2007/0034587 A1 | 2/2007 | Morath | |
| 2007/0282459 A1 * | 12/2007 | Schafer et al. | 700/4 |
| 2009/0204308 A1 | 8/2009 | Manan et al. | |

FOREIGN PATENT DOCUMENTS

| | | |
|---|---|---|
| DE | 10196735 T5 | 11/2003 |
| DE | 102005059768 A1 | 1/2007 |
| DE | 60214965 T2 | 3/2007 |
| EP | 1814268 A1 | 8/2007 |

OTHER PUBLICATIONS

MTS Enhances Mobile Hydraulic Line with Redundant Sensor, Press Release, Jun. 14, 2007, MTS Systems Corporation, Sensors Division, Cary, NC, USA.

* cited by examiner

*Primary Examiner* — Thomas Tarcza
*Assistant Examiner* — Adam Tissot
(74) *Attorney, Agent, or Firm* — The PL Law Group, PLLC

(57) ABSTRACT

A control system for a construction machine includes at least one sensor and at least one controller, wherein a serial connection exists between the sensor and the controller, and wherein at least one sensor and/or controller are of the two-channel or multi-channel type. Furthermore, this invention relates to a method for operating such control system for a construction machine.

22 Claims, 2 Drawing Sheets

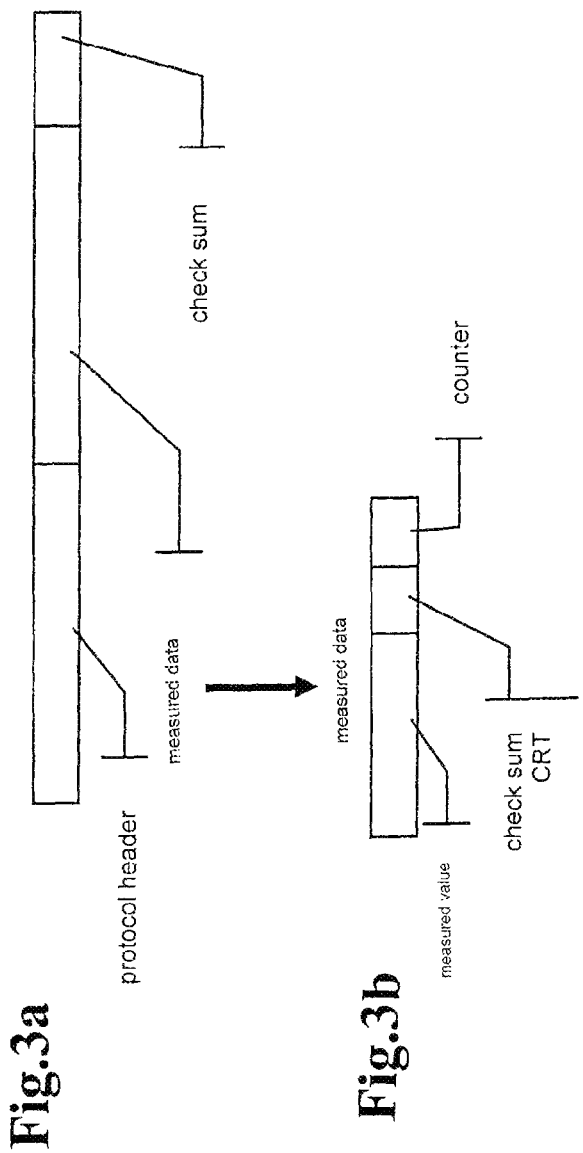

CONTROL SYSTEM FOR CONSTRUCTION MACHINES AND METHOD FOR OPERATING THE CONTROL SYSTEM

CROSS-REFERENCE TO RELATED APPLICATION AND CLAIM OF PRIORITY

This application claims the benefit of German Patent Application No. 20 2009 060 321.2, filed on Dec. 23, 2009, in the German Patent and Trademark Office, the disclosures of which are incorporated herein in their entirety by reference.

BACKGROUND

1. Field of the Invention

The present invention relates to a control system for a construction machine with at least one sensor and at least one controller, wherein a serial connection exists between the sensor and the controller.

2. Description of the Related Art

To meet the strict safety requirements when operating complex machines, the installation of a component of the machine may be redundant or diverse.

In the case of a sensor, since the sensor under certain circumstances takes up relevant measured variables for the safe operation of the machine, redundant sensors may be installed for safe operation of the machine, particularly in the data transfer from the sensor to the processor. Redundancy may also be necessary in order to guarantee the required safety conditions. A possible malfunction of individual components of the entire measurement chain can be detected on the basis of the redundantly present measured results.

For the foregoing reasons, there is a need for a measurement arrangement which provides greater security and a finer reaction possibility to possible measurement deviations.

SUMMARY

According to an aspect of the present invention, there is provided a sensor which allows substantially smaller tolerance limits.

According to an aspect of the present invention, the safety of such control system for a construction machine is increased.

According to an aspect of the present invention, a control system for a construction machine, including: at least one sensor and at least one controller, wherein a serial connection exists between the sensor and the controller; wherein the at least one sensor and the at least one controller are of the two-channel or multi-channel type; each of the at least one sensor includes at least two measured value pick-ups and at least two processing units which are arranged redundantly and/or diversely with respect to each other; and the at least two processing units of the sensor are coupled with each other and a data connection exists between the processing units.

According to an aspect of the present invention, a control system for a construction machine, including: at least one sensor including: a sensor housing having a specimen feed to receive a medium to be detected; a first measured value pick-up housed in the sensor housing, the first measured value pick-up measuring a variable to obtain a first measured value; a second measured value pick-up housed in the sensor housing, the second measured value pick-up measuring a variable to transmit a second measured value, the first and second measured value pick-ups mounted in the specimen feed to be spaced apart from each other with a substantial identical distance from an entry of the specimen feed; a first processing unit having a first input receiving the first measured value from the first measured value pick-up and a first output; and a second processing unit having a second input receiving the second measured value from the second measured value pick-up and a second output, the first and second processing units coupled to each other via a signal connection to communicate the first and second measured value pick-ups; wherein at least one of the first processing unit and the second processing unit has a comparing unit to compare the first measured value with the second measured value, the first processing unit and the second processing unit store one of the first and second measured value in the first output and the second output when a deviation of the compared first and second measured values is within a preset tolerance limit, and mark one of the first and second measured value as faulty and store the marked value from the first or second output when a deviation of the compared first and second measured values is not within the preset tolerance limit; and at least one controller serially connected to the at least one sensor, the at least one controller including: a first control unit receiving data from the first and second outputs of the first and second processing units and verifying the data, the first control unit forwarding the data to the second control unit; and the second control unit receiving the data from the first control unit to verify the data.

According to an aspect of the present invention, the serial connection between the at least one sensor and the at least one controller is a bus system selected from the group consisting of a controller-area network (CAN) bus system, a Liebherr system bus, an Ethernet-based bus system and a combination thereof.

According to an aspect of the present invention, at least one sensor further includes a unit encrypting and packing the measured value to be transmitted, and at least one of the first and second control units of the controller further includes a unit for decrypting and unpacking the measured value.

According to an aspect of the present invention, at least one sensor detects a measurement parameter selected from the group consisting of pressure, angle, rotation, inclination, length, distance, sound, brightness, humidity, direction and filling level.

According to an aspect of the present invention, the measured value of the at least one sensor is filed in a data packet of a measurement protocol and provided with a safety and/or protection function by the sensor; the data packet is transmitted to the at least one controller via the serial connection; and the at least one controller checks the data packet or the measured value for correctness by the safety and/or protection function.

According to an aspect of the present invention, a control system for a construction machine, including: at least one sensor including: a sensor housing having a specimen feed to receive a medium to be detected; a first measured value pick-up housed in the sensor housing, the first measured value pick-up measuring a variable to obtain a first measured value; a second measured value pick-up housed in the sensor housing, the second measured value pick-up measuring a variable to obtain a second measured value, the first and second measured value pick-ups mounted in the specimen feed to be spaced apart from each other with a substantial identical distance from an entry of the specimen feed; a first processing unit having a first input receiving the first measured value from the first measured value pick-up and a first output; and a second processing unit having a second input receiving the second measured value from the second measured value pick-up and a second output, the first and second processing units coupled to each other via a signal connection to communicate the first and second measured value pick-ups; wherein at least one of the first processing unit and the second processing unit has a comparing unit to compare the first measured value with the second measured value, the first processing unit and the second processing unit store one of the first and second measured value in the first output and the second output when a deviation of the compared first and second measured values is within a preset tolerance limit, and mark one of the first and second measured value as faulty and store and output the marked value from the first or second output when a deviation of the compared first and second measured values is not within the preset tolerance limit; and at least one controller serially connected to the at least one sensor, the at least one controller including: a first control unit receiving data from the first and second outputs of the first and second processing units and verifying the data, the first control unit forwarding the data to the second control unit; and the second control unit receiving the data to verify the data; wherein the at least one controller requests cyclically a sensor status and the sensor transmits its sensor status description in a data packet to the inquiring controller, and the sensor status description is determined internally in each processing unit of the sensor; and the at least one controller checks the data packet or the measured value for correctness by the safety and/or protection function.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 shows a transmission protocol of the control system.

DETAILED DESCRIPTION

Figure 1:
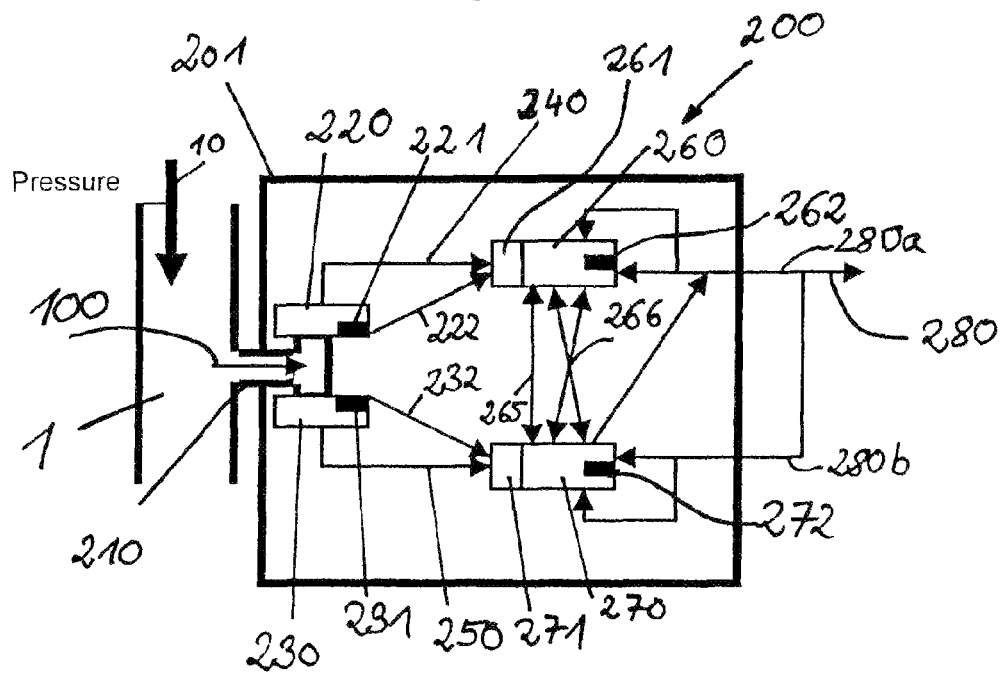
FIG. 1 shows a pressure sensor according to an embodiment of the present invention.

The present invention will now be described more specifically with reference to the following Embodiments. It is to be noted that the following descriptions of preferred Embodiments of this invention are presented herein for purpose of illustration and description only; it is not intended to be exhaustive or to be limited to the precise form disclosed.

According to an embodiment of the present invention, a control system includes at least one sensor and at least one controller, wherein at least one sensor is connected with the controller via a serial connection. At least one sensor and/or controller are of the two-channel or multi-channel type, and at least two measured value pick-ups and/or at least two processing units are arranged redundantly and/or diversely with respect to each other, At least two processing units of the sensor are coupled with each other and/or a data connection exists between the processing units.

Thus, the system includes one or more sensors which detect one or several measurement values and transmit them to at least one controller via the serial connection. The controller serves as control and/or regulating unit for operating the construction machine, which operates on the basis of the detected and evaluated measurement values of at least one sensor. There can be provided one or more controllers for performing the same or different tasks. In accordance with the invention, at least one sensor and/or controller of the control system each is of the two-channel or multi-channel type. While a single-channel system generally reacts to errors with a failure, two- or multi-channel systems can make an internal check and detect possible processing errors. At least one sensor is of the two- or multi-channel type, so that the detected measurement value is present in safe and redundant form. At least one controller is of the two- or multi-channel type, so that a safe and redundant processing of measurement values is possible.

A sensor may include at least two transducers (that is measured value pick-ups) and at least two processing units within a sensor housing. The measured value pick-up is defined as a part of the sensor which directly responds to a measured variable to be detected. Each measured value pick-up is preferably connected via a signal line to a processing unit so that the signal value representing the measured value can be transferred to the processing unit.

To increase the reliability or safety of the sensor, both the measured value pick-ups and the processing units are made redundant and/or diverse. The at least two measured value pick-ups pick up at least two measured values independently of one another and transfer them to their connected processing unit. In accordance with an embodiment of the present invention, the arrangement of the at least two measured value pick-ups in a sensor housing with one specimen feed guarantees that the effective actual values of the measurement value to be checked are applied to both measured value picks-ups without time delay. The measured value pick-ups and/or the processing unit are preferably made diverse.

The minimally spaced arrangement of the two measured value pick-ups in the sensor housing in accordance with an embodiment of the present invention reduces the time offset of the detected measured values substantially, or practically precludes the time offset. All the measured value pick-ups are preferably arranged with the same distance from the entry of the specimen feed. Accordingly, a change in the measured variable is obtained simultaneously in time at all the measured value pick-ups. Furthermore, the sensor in accordance with an embodiment of the invention represents a simple implementation of a redundantly designed sensor system since the redundancy is already integrated in the sensor housing. A complex arrangement of a plurality of separate independent sensors is not required.

Particularly, the at least two measured value pick-ups are arranged directly next to one another within or in the end region of the specimen feed of the sensor. Alternatively, the measured value pick-ups may be attached to be oppositely disposed within the specimen feed. The smaller the spatial distance between two measured value pick-ups is, the smaller the time-delayed detection of the actual value of the measured variable is. The time offset of the actual values between the pick-ups can be neglected due to the arrangement in accordance with the embodiment of the present invention.

If the measurement result depends on external disturbance variables, one or more secondary sensors may be further arranged within the sensor housing. For example, temperature sensors or sensors for detecting the atmospheric pressure may be arranged. The measured values provided by the secondary sensors are supplied to the processing unit. Advantageously, external influences on the sensor thereby can be compensated by the measured data provided by the secondary sensors.

The at least two processing units may be coupled with each other. At least two processing units preferably work on the basis of a common clock source or employ separate clock sources which can be synchronized with each other. The use of a common time base or the synchronized signal processing of the processing units reduces or optimizes the time offset of the measured values applied to the outputs of the processing units.

The mutual exchange of the measured values or other data of the individual processing units or other data preferably is realized via the signal connection between the processing units. Consequently, each processing unit provides its detected measurement value to one or all the other processing units. A comparing unit may be provided to compare at least one first measured value with at least one of the other measured values. At least one processing unit may compare its own measurement value with the measurement values of all the other connected processing units.

According to an embodiment of the present invention, the comparing unit may be provided such that a plausibility check, in particular a cross-comparison, can be carried out between at least two measured values. If the deviations lie within definable tolerance limits, the measurement is classified as plausible and the at least two processing units agree on a uniform measured value applying to all or to at least some processing units. This is then stored as a binary value in the output region of all or some of the processing units. For example, two processing units compare their measured values with each other. In the case of only small tolerable deviations, the first processing unit stores its measured value in the output region and the second or all the other processing units discard their own measured values and instead store the uniform measured value of the first processing unit in their output region. Accordingly, the bit patterns of the stored values are identical in all output regions. If the deviations of the two compared measured values lie outside the definable tolerance range, the measurement result of at least one processing unit can be marked as faulty. The measured values marked as faulty can be stored in the output region of the at least two processing units and can optionally be transmitted to the controller via the serial connection. Due to the marking, the controller can infer a malfunction of the sensor.

The comparing unit may be realized by a programmable microprocessor or digital signal processor (DSP). The coupling of the processing units or of the microprocessors may be provided by the central clock feed of the microprocessors. The synchronization of the microprocessors minimizes the time offset between the measured values since all processing operations inside the microprocessors can be executed simultaneously or synchronously with respect to each other. Accordingly, the individual actual values of the measured variable can be evaluated and output almost simultaneously inside the microprocessors.

In an embodiment of the invention, at least one controller includes at least two control units arranged redundantly and/or diversely with respect to each other. The control units realize the two- or multi-channel configuration of the controller and are linked with each other via an arbitrary internal bus system. Accordingly, the communication or the data exchange between the individual control units is possible. Independent of or dependent on each other, the control units process the data received. Consequently, the evaluated data are present in the controller in redundant form, and on the basis of the information present in redundant form specific measures can be taken by the controller.

The serial connection between at least one sensor and at least one controller may be a bus system, in particular a controller-area network (CAN) bus system, a Liebherr system bus or an Ethernet-based bus system. The bus devices can be divided into bus master, bus observer and sensors. Advantageously, the controller acts as bus master. It is conceivable that at least one or more bus masters are provided, which can be associated to one or more controllers. The transmitting and/or receiving unit preferably integrated in the processing unit of at least one sensor provides the detected measured values or the processed measured signals to the bus. It can be provided that the processing unit checks the transmitted signal for correctness parallel to the transmission process. Accordingly, the processing unit simultaneously receives its transmitted signal. It is possible that all processing units of the sensor are connected to the bus system. In this case, a processing unit transmits its signal via the bus and all the other processing units also receives the transmitted signal applied to the bus by the one processing unit and check the same for correctness or make a comparison between the bus signal and its expected value. In the case of an error detection, at least one processing unit may apply the corresponding bus signal to ground for a certain period, in particular 512 µs. This corresponds to the corresponding timeout of the transmission protocol of the bus system used, whereby all the signals applied to the bus are declared invalid or discarded inside the receiving units.

According to an embodiment of the present invention, a unit for encoding or packaging the measured value to be transmitted may be provided. The unit for encoding or packing the measured value may use suitable data processing algorithms on the digitized measured value, such as cyclic redundancy check (CRC) and/or Chinese remainder theorem (CRT) algorithms. The measured value is accordingly transmitted in encoded form via a connected bus system. On the receiver side, a unit for decoding or unpackaging may be provided to decode or unpack the encoded or packaged value, and may detect and correct processing errors of the measured value which occur in encoding or packing.

In accordance with an embodiment of the invention, the at least one controller cyclically initiates a status inquiry for each sensor and in response each sensor transmits its sensor status description to the inquiring controller via the bus system.

A measured value is redundantly and diversely detected and processed by at least one sensor and internally checked for correctness and subsequently filed in a data packet of the measurement protocol, which is provided with a safety information by the sensor for executing the safety and/or protection function. Furthermore, the data packet is transmitted to a controller via the serial connection. On the receiver side or inside the controller, the data packet or the measured value is checked for correctness, in particular for an error-free transmission, by the redundantly and/or diversely designed controller by the safety and/or protection function.

In accordance with a particular aspect of the method, an individual sensor description is stored for each channel of at least one sensor. This sensor description represents an unambiguous and individual identification of each sensor used. The data are firmly filed by the manufacturer in all channels of the sensor, in particular inside the processing units. On the basis of the sensor description, an individual key can be calculated for each sensor by a specified algorithm. Accordingly, each sensor of the control system possesses a clearly identifiable and assigned key which preferably is transmitted in addition when transmitting the measurement value from the sensor to the controller. The sensor description can cyclically be requested by the controller, in order to monitor the functionality of the sensor.

According to an embodiment of the present invention, at least one controller acts as bus master and initiates a status inquiry for each sensor. The status inquiry for example can be performed cyclically. As a response, each sensor transmits its sensor status description in a data packet of a standalone protocol via the bus system to the inquiring controller. By corresponding diagnostic methods, the sensor status description is determined internally in each channel or each processing unit of the sensor. The repetition rate of the status inquiry can be defined in a variable way and preferably is adapted to the existing safety requirements.

Furthermore, the controller acting as bus master may request the measurement value of at least one sensor by the measurement protocol. The measured value may be transmitted inside a data packet from the sensor to the controller exclusively upon request of the controller or bus master. By complying with the required safety regulations, the transmission of a single measured value or data packet can be effected repeatedly. For transmission, the measurement protocol provided for this purpose is used. The same generates a data packet preferably from the measured value, a time stamp and a coded safety information, wherein the coded safety information expediently is calculated from the measured value, the time stamp and the individual key of the sensor by the safety and/or protection function. By the safety and/or protection function possible data manipulations or transmission errors on the receiver side can be detected and particularly preferably be corrected upon evaluation of the contents of the transmitted data packets. For this purpose, the contents of the response data of the status inquiry or measurement value inquiry are required and processed together, since this information is required for the check. In accordance with a particular aspect of the method, the individual key is used for verifying the transmitted data packets, in particular for verifying the measurement values and the sensor status description.

It is possible that a control unit of the controller receives data of at least one sensor via the bus system and forwards copies of the data or data packets to all the other control units of the controller. The content of the received data packet is redundantly processed and checked by the individual control units. A successful check preferably is positively confirmed by every single control unit. Checking the received measurement value or the data packet preferably is effected by verifying the data on the basis of the safety and/or protection function.

It generally applies that such a sensor has at least two measured value pick-ups for any desired variables to be detected. The sensor may be suitable for measuring one or more different variables such as pressure, angle, rotation, inclination, length, distance, sound, brightness, humidity, direction or level. The compatibility of the sensor depends on the installed measured value pick-up(s). The specimen feed may be expediently adapted to the variable to be detected or to the medium. The type of measured value processing is preferably identical in all the sensors. All the sensors preferably have at least two measured value pick-ups and/or processing units arranged redundantly or diversely with respect to each other. Examples of the sensors include a cable length encoders, a laser sensors, a rotary angle transducer, an inclinometer and a length measuring device via a rotary encoder.

FIG. 1 shows the schematic construction of a sensor 200 in accordance with an embodiment of the present invention. In the embodiment of FIG. 1, the redundantly designed two-channel sensor 200 operates as a pressure sensor for detecting the hydraulic pressure of the medium inside the conduit 1. The thread at the sensor housing 201 of the sensor 200 is screwed into the matching screw connection of the conduit 1. When the conduit 1 is filled with hydraulic oil or with a similar pressure medium, the space of the specimen feed 210 is also filled up to the measured value pick-ups 220, 230 arranged therein. The measured value pick-ups 220, 230 convert the detected measured pressure variable (actual value) within the specimen feed 210 into corresponding electric signals which are supplied to the inputs 261, 271 of the two processing units 260, 270 via the two signal lines 240, 250. The two measured value pick-ups 220, 230 may be spaced apart from each other, and the distances from the entry of the specimen feed 210 are substantially identical to each other so that the identical measured values are obtained simultaneously at both the measured value pick-ups 220, 230.

Each measured value pick-up 220, 230 may have a respective secondary sensor 221, 231 for detecting disturbance variables caused by the environment. A plurality of secondary sensors are also possible for detecting one disturbance variable or different disturbance variables such as temperature or air pressure influences. Due to the close proximity of the secondary sensors 221, 231, one secondary sensor 221 or 231 would also be technically sufficient at the cost of redundancy. The determined disturbance influences are transmitted via the signal lines 222, 232 to the inputs 261, 271 of the responsible processing units 260, 270 for disturbance variable compensation. Both the secondary sensors 221, 231 may be temperature sensors to compensate temperature-dependent measurement fluctuations of the sensor 200. Alternatively, or in addition, the secondary sensor 221, 231 may be a pressure sensor which detects the atmospheric pressure present on the sensor 200 or within the sensor housing 201 and forwards the same for compensation.

During the operation of the sensor 200, the measured value pick-ups 220, 230 as well as the secondary sensors 221, 231 deliver continuously provide measured signals via the signal lines 240, 250, 222, 232 to the corresponding inputs 261, 271 of the two processing units 260, 270.

The two processing units 260, 270 may have an integrated circuit arrangement which may include a programmable microprocessor or digital signal processor (DSP). The processing units process the electrical measured signals of the measured value pick-ups 220, 230 and of the secondary sensors 221, 231 transmitted to the inputs 261, 271. The processing units 260, 270 perform the analog-to-digital conversion of the applied values takes place, and each processing unit 260, 270 provides its own converted measured value to the other processing unit via the connection 266. A plausibility check of the present measured values by the method of cross-comparison takes place within the processing units 260, 270 to monitor the proper operation of the sensor. Since the respective measured values are applied to the inputs 261, 271 of the two processing units in a time-dependent and continuous manner, the two processing units 260, 270 expediently operate with a common time basis 265. Both the processing units either are fed by a common clock source or employ separate clock sources which are synchronized with each other. According to an embodiment of the present invention, a common time basis 265 is used.

If the deviations of the measured values do not exceed the defined tolerance limits, the measurement is classified as plausible. A measured value, for example, the measured value from the processing unit 260, is picked up as the measured value by both processing units 260, 270 and is then stored in the output region 262, 272 for transfer. Identical bit patterns are thus ensured in the output regions 262, 272 during the sensor operation without malfunction after the digitizing and the comparison of the measured values. The transfer of the unified measured value is sufficient for the forwarding of the sensor values to a central evaluation unit or controller of a machine.

If the deviations lie outside the preset tolerance range, the measured values are marked as faulty and are stored together with the marking in the output region 262, 272 of the two processing units 260, 270.

The two processing units 260, 270 are linked via the branch buses 280a, 280b to the bus line 280 of the system bus via the two branch buses 280a, 280b within the housing 201.

Figure 2:
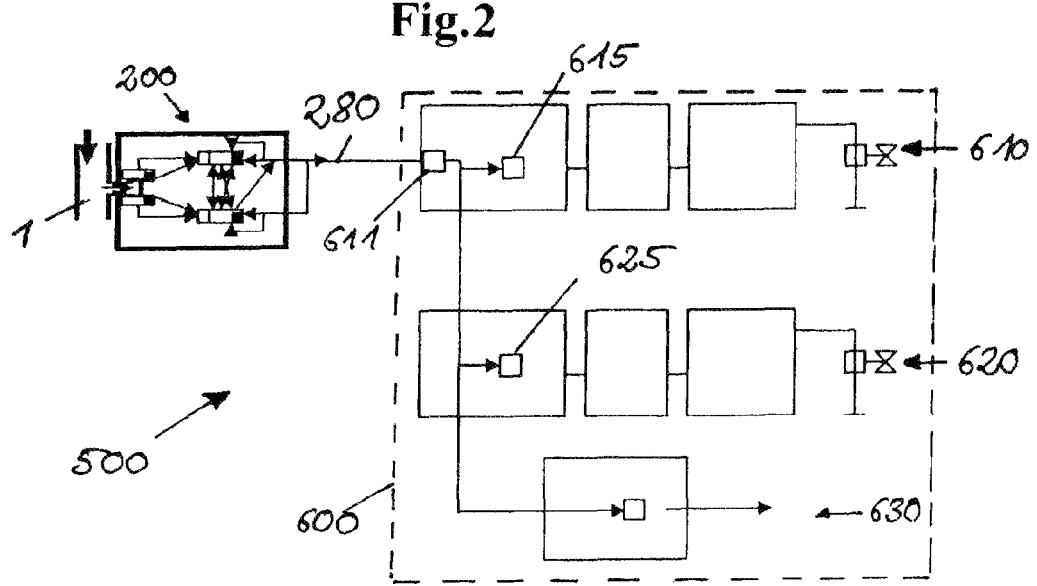
FIG. 2 shows a schematic representation of a control system according to an embodiment of the present invention.

FIG. 2 shows the schematic structure of the control system 500 of the invention. The system 500 includes the sensor 200, the bus system 280 and the controller 600. According to an embodiment of the present invention, the system 500 may have a plural sensors and controllers.

Each sensor 200 includes its unambiguous and individual identification, which is filed both in the first channel or in the processing unit 260 of the sensor 200 and also in the second channel or in the processing unit 270. This identification will subsequently be understood as individual sensor description, from which the individual key of the sensor 200 is calculated via a specified algorithm.

Furthermore, the status of each sensor 200 is defined via the sensor status description. By corresponding diagnostic methods, the same is determined internally in each channel or each processing unit 260, 270.

The sensor 200 is connected with the controller 600 of a construction machine via the bus system 280. The bus system 280 for example is configured as Liebherr system bus, as known from DE 196 47 131 C2 which is incorporated herein by reference. The controller 600 may be configured in two-channel form via the control units 610 and 620. To minimize the number of bus devices, only the control unit 610 of the controller 600 may be configured as bus master and receives the transmitted data by its receiving unit 611. It is also conceivable to employ a configuration of the control system 500 with several bus masters, which are responsible for different task areas of the control system 500.

The aforementioned individual sensor description is scanned cyclically by the bus master of the control unit 610. This ensures that the sensor 200 is checked to be active and operable. The same applies to the sensor status description, which likewise is scanned cyclically by the bus master using a standalone protocol, wherein the repetition rate of the scan cycle can variably be adapted to the respective safety requirements.

The measured value of the sensor 200 is repeatedly transmitted to the controller 600 or to the receiving unit 611 of the control unit 610, exclusively upon request of the bus master. If the controller 600 needs data from the sensor 200, the bus master places the scans on the bus 280 by initiating the different protocols.

Before the measured values are transmitted via the connected bus system using the bus protocol, the data packet 300 of FIG. 3b is formed. To encode the measured value, a suitable security algorithm is used which includes the checksum formation via the measured value and the use of a restoration algorithm. A combination of CRC and CRT may be named as an example. A counter is added to the data packet 300 to identify the measured value or the data packet 300. The packaging or encoding of the measured values increases the safety since transmission errors of the measured values can be recognized on the receiver side and can preferably be remedied.

The processing unit 260 reacts to the received request of the bus master by transmitting the measured value filed in the output region 262 or the individual sensor description or sensor status description. For transmitting the measured value, the safety information is calculated and the entire data packet of the measurement protocol is packed into the entire protocol (FIG. 3a) of the bus system 280 and placed on the bus 280. During the transmission process, the processing unit 260 simultaneously checks the correctness of the transmission signal which it has placed on the bus 280. The processing unit 270 proceeds analogously, wherein the same checks the correctness of the signal placed on the system bus by the processing unit 260, in that the signal is compared with its expected value, i.e., the measured value filed in the output 272, or with its individual sensor description or sensor status description. If one of the processing units 260, 270 to be checked identifies a transmission error, the processing unit 260, 270 invalidates the protocol, in the case of the Liebherr system bus for example by applying the bus signal to ground for a certain period, in particular 512 µs. The time span characterizes a corresponding timeout of the Liebherr system bus protocol, so that all transmission signals transmitted by the bus are discarded by the individual receiving units.

In general, it applies that all bus devices, i.e., the observers, bus master and all sensors can listen in on the contents of the transmitted data. For each sensor 200, defined and always identical regions are provided in the local data fields, namely the fields BW and XW, in the bus master and the observers. The transmitted useful data, i.e., the measurement protocol, are stored in the local data field BW, which is divided into the values measurement value, time stamp and safety information. Thus, each bus device reads the data placed on the bus 280 and correspondingly fills its local data field. The response of the sensor 200 to the status inquiry is filed in the data field XW and completed further with the individual key of the associated sensor. Accordingly, the key is independently calculated locally in each receiver via a specified algorithm.

In the embodiment of FIG. 2, the control unit 610 receives the transmitted data by the receiving unit 611. The aforementioned transmission protocols additionally are packed into the entire protocol (FIG. 3a) of the bus system 280, which is secured via a check sum. The control unit 610 fills its local data fields BW and XW with the transmitted data and executes the safety and protection function for verifying the sensor data via a first control subunit 615. On the one hand, the correctness of the data thus can be determined, and on the other hand a correction of the transmission errors preferably can be performed. For verifying the data, the contents of both data fields are required and processed with each other inside the first control subunit 615.

Subsequently, the control unit 610 forwards copies of the contents of its data fields BW and XW to the redundantly or diversely arranged control unit 620. Forwarding is effected via an arbitrary internal bus system, such as serial peripheral interface (SPI) bus, controller-area network (CAN) bus, local area network (LAN) bus, least-significant bit (LSB) bus, and the local data fields of the control unit 620 are occupied with the data copies. Executing the safety and protection function is effected analogous to the control unit 610 by using a second control subunit 625. Both control units confirm the correctness of the received data as a result of a successful verification.

The protection and safety function may be based on the execution of known safety algorithms or restoration algorithms, such as CRC or CRT algorithms.

Due to the redundant and/or diverse design of the controller, the checked measurement data are delivered to the processing logic of the control system via different pipeline structures. If the encrypted measurement data are corrupted by the pipeline structure, the processing controller 600 will detect these errors. Possibly, the controller 600 even can correct these errors, if the safety algorithm and the restoration algorithm have been suitably selected.

In the example of FIG. 2, the possible connection of further control units 630 of the controller 600 is also indicated. The illustrated control system 500 is not limited to a single controller 600. Applications with several controllers, several sensors and observers are conceivable, wherein all sensors and all controllers are designed in accordance with the aforementioned configuration possibilities.

The embodiment of the sensor 200 serves for measuring a pressure inside the conduit 1. Such configuration of the sensor 200, however, is not limited to measuring the parameter pressure. Further embodiments of the sensor 200 provide for measuring an angle, rotation, inclination, length, distance, sound, brightness, humidity, direction or filling level. For this purpose, it is merely necessary to adapt the two transducers 220, 230 used to the corresponding medium and to modify the specimen supply 210. Possible embodiments include a cable length encoder, a laser sensor, a rotary angle transducer, an inclinometer and a length measuring device via a rotary encoder.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A control system for a construction machine, comprising:
   at least one sensor and at least one controller, wherein a serial connection exists between said at least one sensor and said at least one controller;
   wherein said at least one sensor and said at least one controller are of the two-channel or multi-channel type;
   each of said at least one sensor comprises at least two measured value pick-ups mounted in a specimen feed to be spaced apart from each other with a substantial identical distance from an entry of the specimen feed and at least two processing units which are arranged redundantly with respect to each other; and
   said at least two processing units of the sensor are coupled with each other and a data connection exists between the processing units.

2. The control system for a construction machine according to claim 1, wherein each of said at least one sensor further comprises at least one secondary sensor selected from the group consisting of a temperature sensor, a pressure sensor and a combination thereof, and said each of said at least one sensor and said at least one secondary sensor are within a sensor housing.

3. The control system for a construction machine according to claim 1, wherein said at least one controller comprises at least two control units arranged redundantly with respect to each other.

4. The control system for a construction machine according to claim 1, wherein the serial connection between said at least one sensor and said at least one controller is a bus system selected from the group consisting of a controller-area network (CAN) bus system, a Liebherr system bus, an Ethernet-based bus system and a combination thereof.

5. The control system for a construction machine according to claim 1, wherein said at least one sensor further includes a unit encrypting and packing the measured value to be transmitted, and said at least one controller further includes a unit for decrypting and unpacking the measured value.

6. The control system for a construction machine according to claim 1, wherein said at least one sensor detects a measurement parameter selected from the group consisting of pressure, angle, rotation, inclination, length, distance, sound, brightness, humidity, direction and filling level.

7. The control system for a construction machine according to claim 1, wherein said at least one sensor detects a measured value redundantly;
   the measured value of said at least one sensor is filed in a data packet of a measurement protocol and provided with a safety or protection function by the sensor;
   the data packet is transmitted to said at least one controller via the serial connection; and
   said at least one controller checks the data packet or the measured value for correctness by the safety or protection function.

8. The control system according to claim 7, wherein, for each channel of said at least one sensor an individual sensor description is stored, which is cyclically scanned by the controller, and an individual key is calculated from the sensor description by an algorithm.

9. The control system according to claim 7, wherein said at least one controller cyclically initiates a status inquiry for each sensor and in response each sensor transmits its sensor status description to the inquiring controller via a bus system.

10. The control system according to claim 7, wherein said at least one controller requests the measured value of said at least one sensor by the measurement protocol.

11. The control system according to claim 8, wherein, for verification of the transmitted data packets of the measured values and the sensor status description, the individual key is used.

12. The control system according to claim 7, wherein said at least one controller comprises at least two control units, and one control unit of the controller receives the data of said at least one sensor via the bus system and forwards copies of the data to all the other control units of the controller.

13. The control system according to claim 12, wherein each control unit verifies the received sensor data or the data copies by the safety or protection function.

14. A control system for a construction machine, comprising:
   at least one sensor comprising:
      a sensor housing having a specimen feed to receive a medium to be detected;
      a first measured value pick-up housed in the sensor housing, the first measured value pick-up measuring a variable to obtain a first measured value;
      a second measured value pick-up housed in the sensor housing, the second measured value pick-up measuring a variable to transmit a second measured value, the first and second measured value pick-ups mounted in the specimen feed to be spaced apart from each other with a substantial identical distance from an entry of the specimen feed;
      a first processing unit having a first input receiving the first measured value from the first measured value pick-up and a first output; and
      a second processing unit having a second input receiving the second measured value from the second measured value pick-up and a second output, the first and second processing units coupled to each other via a signal connection to communicate the first and second measured value pick-ups;
      wherein at least one of the first processing unit and the second processing unit has a comparing unit to compare the first measured value with the second measured value, the first processing unit and the second processing unit store one of the first and second measured value in the first output and the second output when a deviation of the compared first and second measured values is within a preset tolerance limit, and mark one of the first and second measured value as faulty and store the marked value from the first or second output when a deviation of the compared first and second measured values is not within the preset tolerance limit; and at least one controller serially connected to said at least one sensor, said at least one controller comprising:
a first control unit receiving data from the first and second outputs of the first and second processing units and verifying the data, the first control unit forwarding the data to a second control unit; and
the second control unit receiving the data from the first control unit to verify the data.

15. The control system for the construction machine according to claim 14, wherein the serial connection between said at least one sensor and said at least one controller is a bus system selected from the group consisting of a controller-area network (CAN) bus system, a Liebherr system bus, an Ethernet-based bus system and a combination thereof 16. The control system for the construction machine according to claim 14, wherein said at least one sensor further includes a unit encrypting and packing the measured value to be transmitted, and at least one of the first and second control units of the controller further includes a unit for decrypting and unpacking the measured value.

17. The control system for the construction machine according to claim 14, wherein said at least one sensor detects a measurement parameter selected from the group consisting of pressure, angle, rotation, inclination, length, distance, sound, brightness, humidity, direction and filling level.

18. The control system for a construction machine according to claim 14, wherein the measured value of said at least one sensor is filed in a data packet of a measurement protocol and provided with a safety or protection function by the sensor;
the data packet is transmitted to said at least one controller via the serial connection; and
said at least one controller checks the data packet or the measured value for correctness by the safety or protection function.

19. A control system for a construction machine, comprising:
at least one sensor comprising:
a sensor housing having a specimen feed to receive a medium to be detected;
a first measured value pick-up housed in the sensor housing, the first measured value pick-up measuring a variable to obtain a first measured value;
a second measured value pick-up housed in the sensor housing, the second measured value pick-up measuring a variable to obtain a second measured value, the first and second measured value pick-ups mounted in the specimen feed to be spaced apart from each other with a substantial identical distance from an entry of the specimen feed;
a first processing unit having a first input receiving the first measured value from the first measured value pick-up and a first output; and
a second processing unit having a second input receiving the second measured value from the second measured value pick-up and a second output, the first and second processing units coupled to each other via a signal connection to communicate the first and second measured value pick-ups;
wherein at least one of the first processing unit and the second processing unit has a comparing unit to compare the first measured value with the second measured value, the first processing unit and the second processing unit store one of the first and second measured value in the first output and the second output when a deviation of the compared first and second measured values is within a preset tolerance limit, and mark one of the first and second measured value as faulty and store and output the marked value from the first or second output when a deviation of the compared first and second measured values is not within the preset tolerance limit; and at least one controller serially connected to said at least one sensor, said at least one controller comprising:
a first control unit receiving data from the first and second outputs of the first and second processing units and verifying the data, the first control unit forwarding the data to a second control unit; and
the second control unit receiving the data to verify the data;
wherein said at least one controller requests cyclically a sensor status and the sensor transmits its sensor status description in a data packet to the inquiring controller, and the sensor status description is determined internally in each processing unit of the sensor; and
said at least one controller checks the data packet or the measured value for correctness by the safety or protection function.

20. A control system for a construction machine, comprising:
at least one sensor and at least one controller, wherein a serial connection exists between said at least one sensor and said at least one controller;
wherein said at least one sensor and said at least one controller are of the two-channel or multi-channel type;
each of said at least one sensor comprises at least two measured value pick-ups mounted in a specimen feed to be spaced apart from each other with a substantial identical distance from an entry of the specimen feed and at least two processing units which are arranged diversely with respect to each other; and
said at least two processing units of the sensor are coupled with each other and a data connection exists between the processing units.

21. The control system for a construction machine according to claim 20, wherein said at least one controller comprises at least two control units arranged diversely with respect to each other.

22. The control system for a construction machine according to claim 20, wherein said at least one sensor detects a measured value diversely;
the measured value of said at least one sensor is filed in a data packet of a measurement protocol and provided with a safety or protection function by the sensor;
the data packet is transmitted to said at least one controller via the serial connection; and
said at least one controller checks the data packet or the measured value for correctness by the safety or protection function.

* * * * *